United States Patent [19]

Koves

[11] Patent Number: 5,540,899
[45] Date of Patent: Jul. 30, 1996

[54] BI-DIRECTIONAL CONTROL OF TEMPERATURES IN REACTANT CHANNELS

[75] Inventor: William J. Koves, Hoffman Estates, Ill.

[73] Assignee: UOP, Des Plaines, Ill.

[21] Appl. No.: 362,344

[22] Filed: Dec. 22, 1994

[51] Int. Cl.⁶ ................ B01J 8/02; B01J 8/04; B01J 8/12

[52] U.S. Cl. .......... 422/200; 422/218; 422/221; 422/201; 422/236; 165/2; 165/104.13; 165/113; 165/133; 165/170; 165/182

[58] Field of Search ............... 422/193, 198, 422/218, 221, 236, 200, 201; 165/2, 104.13, 113, 133, 170, 182

[56] References Cited

U.S. PATENT DOCUMENTS

| | | | |
|---|---|---|---|
| 4,693,807 | 9/1987 | Westerman et al. | 208/108 |
| 4,973,401 | 11/1990 | Dang Vu et al. | 208/134 |
| 5,047,217 | 9/1991 | Dang Vu et al. | 422/200 |
| 5,073,352 | 12/1991 | Dang Vu et al. | 422/213 |
| 5,080,872 | 1/1992 | Jezel | 422/201 |
| 5,162,104 | 11/1992 | Bezzeccheri et al. | 422/193 |
| 5,186,909 | 2/1993 | Dang Vu et al. | 422/213 |
| 5,209,906 | 5/1993 | Watkins | 422/200 |
| 5,356,728 | 10/1994 | Balachandran et al. | 429/8 |

FOREIGN PATENT DOCUMENTS 9501834  1/1995  WIPO.

OTHER PUBLICATIONS 236,072 Girod et al.

Primary Examiner—Nina Bhat
Attorney, Agent, or Firm—Thomas K. McBride; John G. Tolomei

[57] ABSTRACT

A reactor arrangement and process for indirectly contacting a reactant stream with a heat exchange stream uses multiple passes of the heat exchange stream in a transverse flow arrangement to control temperature conditions over the width and length of channels through which the reactant passes. The heat transfer coefficient may be varied by changing the number and/or the arrangement of the corrugations along the plates or adding a heat adjustment plate to a channel containing the heat exchange fluid. The reactor arrangement and process of this invention may be used to operate a reactor under isothermal or other controlled temperature conditions. The variation in corrugation arrangements within a single heat exchange section is highly useful in maintaining a desired temperature profile in an arrangement having a cross-flow of heat exchange medium relative to reactants. The corrugations arrangement eliminates or minimizes the typical step-wise approach to isothermal conditions. Multiple heat exchange fluid inputs are particularly useful in fixed bed process arrangements where the temperature of the heat exchange fluids may be adjusted to suit changes in the activity profile through the bed that results from catalyst deactivation.

24 Claims, 4 Drawing Sheets

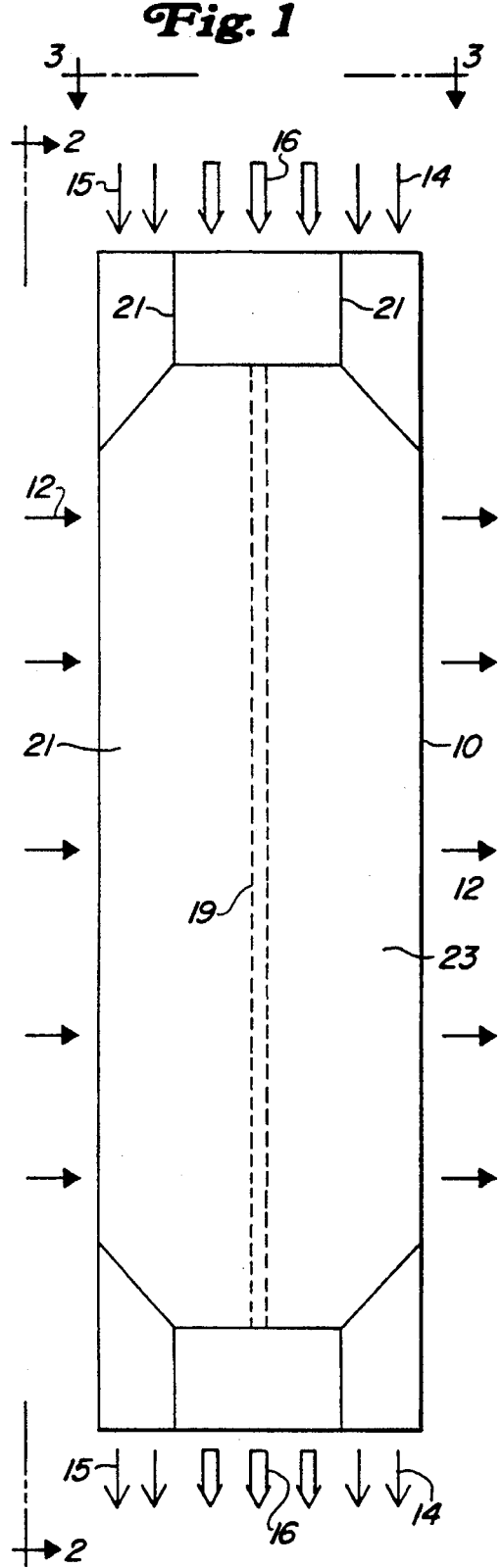
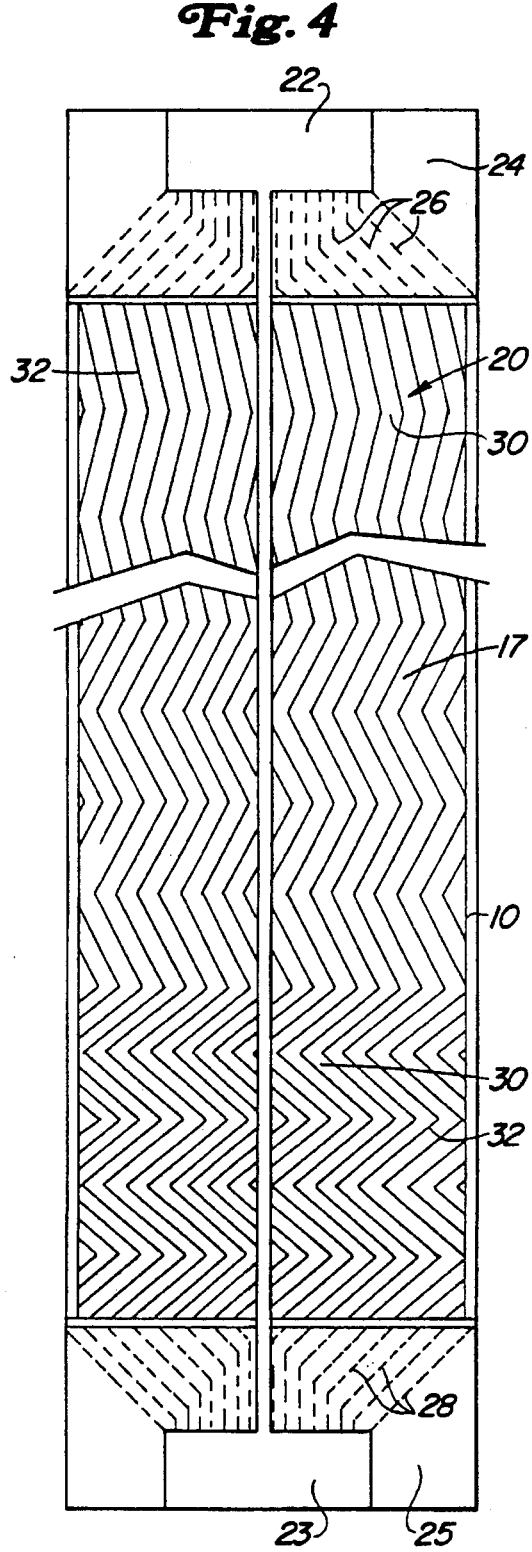

BI-DIRECTIONAL CONTROL OF TEMPERATURES IN REACTANT CHANNELS

FIELD OF THE INVENTION

This invention relates to chemical reactors for the conversion of a reaction fluid while indirectly exchanging heat with a heat exchange fluid.

BACKGROUND OF THE INVENTION

In many industries, like the petrochemical and chemical industries the processes employ reactors in which chemical reactions are effected in the components of one or more reaction fluids under given temperature and pressure conditions. Many of these reactions generate or absorb heat, to various extents, and are, therefore, exothermic or endothermic. The heating or chilling effects associated with exothermic or endothermic reactions can positively or negatively affect the operation of the reaction zone. The negative effects can include among other things: poor product production, deactivation of the catalyst, production of unwanted by-products and, in extreme cases, damage to the reaction vessel and associated piping. More typically, the undesired effects associated with temperature changes will reduce the selectivity or yield of products from the reaction zone.

One solution for controlling the changes in temperature associated with the heats of various reactions has been to operate several adiabatic reaction zones with intermediate heating or cooling between the different reaction zones. In each adiabatic reaction stage, all of the heat liberated or absorbed during the reaction is transmitted directly to the reactive fluid and the reactor internals. The degree of heat release and the tolerance for temperature change determines the total number of adiabatic reactor zones required in such arrangements. Each zone or adiabatic stage of reaction adds significantly to the overall cost of such a process due to the equipment expense of adding piping and heaters or coolers for intermediate stages of heat transfer to a reactant that passes through the reaction zones. Therefore the number of adiabatic steps is limited and such systems offer at best a stepwise approach to isothermal or other controlled temperature conditions. Moreover, the breaking up of a reaction zone into a series of reactors with intermediate heating or cooling of reactants, especially interferes with reactor arrangements that have continual addition and withdrawal of catalyst from the reaction zone.

Other solutions to the problem of temperature control under the influence of different heats of reaction have employed direct or indirect heating or cooling within the reaction zone. Direct heating or cooling utilizes a compensating reaction having a directionally different heat requirement that occurs simultaneously with the principal reaction. The counter balancing reaction offsets heat release or heat adsorption from the principal reaction. One of the simplest forms of such an arrangement is an endothermic process that uses oxidation of hydrogen to heat reactants in an endothermic reaction.

Another solution has been the indirect heating of reactants and/or catalysts within a reaction zone with a heating or cooling medium. The most well known catalytic reactors of this type are tubular arrangements that have fixed or moving bed catalysts. The geometry of tubular reactors poses layout constraints that require large reactors or limit throughput.

Indirect heat exchange has also been accomplished using thin plates to define channels that alternately retain catalyst and reactants between a heat transfer fluid for indirectly heating or cooling the reactants and catalysts. Heat exchange plates in these indirect heat exchange reactors can be flat or curved and may have surface variations such as corrugations to increase heat transfer between the heat transfer fluids and the reactants and catalysts. Although the thin heat transfer plates can, to some extent, compensate for the changes in temperature induced by the heat of reaction, the indirect heat transfer arrangements are not able to offer the complete temperature control that would benefit many processes by maintaining a desired temperature profile through a reaction zone.

Many hydrocarbon conversion processes will operate more advantageously by maintaining a temperature profile that differs from that created by the heat of reaction. In many reactions, the most beneficial temperature profile will be obtained by substantially isothermal conditions. In some cases, a temperature profile directionally opposite to the temperature changes associated with the heat of reaction will provide the most beneficial conditions. An example of such a case is in dehydrogenation reactions wherein the selectivity and conversion of the endothermic process is improved by having a rising temperature profile, or reverse temperature gradient through the reaction zone.

A reverse temperature gradient for the purposes of this specification refers to a condition where the change in temperature through a reaction zone is opposite to that driven by the heat input from the reaction. In an endothermic reaction, a reverse temperature gradient would mean that the average temperature of the reactants towards the outlet end of the reaction zone have a higher value than the average temperature of the reactants at the inlet end of the reaction zone. In an opposite manner, a reverse temperature gradient in an exothermic reaction refers to a condition wherein reactants towards the inlet end of the reactor have a higher average temperature than the reactants as they pass toward the outlet end of the reaction section.

It is known to vary the heat transfer coefficient down the length of a heat transfer surface when indirect heat exchange is used to control the temperature profile along the length of a reaction zone. Changing the heat transfer coefficient in this manner compensates for the loss of temperature of the heat exchange medium as it passes along the length channels that confine the reactants.

In addition to changes in the temperature of the heating medium as the reaction progresses, the heating or cooling requirements for the reactants also change as the reaction progress. For example, in the case of many catalytic processes the reactants undergo an initial period of high activity followed by a rapid fall off of activity as the reaction goes to completion. An endothermic process such as reforming may have a high initial loss of heat followed by a gradual drop of heat consumption as the reaction ceases. Where the reactants and heat exchange medium flow countercurrently it is difficult to simultaneously compensate for both the change in heating medium temperature and heat demand. Passing the reactant stream through the reactant channels in a direction transverse to the principal flow direction of the heating medium causes too much or too little heating to occur at one end of the reaction zone as the heating requirements change along the length of the reaction zone. This can again prevent a process from operating with the most beneficial temperature profile for the ongoing reaction.

The achievement of a desired temperature profile encounter further difficulty when the reaction section uses a fixed bed of catalyst. With a fixed bed of catalyst deactivation and reaction kinetics combine to make the achievement of isothermal or other controlled temperature profiles a dynamic operation. In many chemical reactions, the highest amount of activity occurs as the reactants initially contact the catalyst in the beginning of the bed. This is true while the bed of catalyst is new and has not experienced deactivation. For example, in an endothermic process, operating with a fixed bed of catalyst, a high degree of activity requires high heat input and can result in a decrease in temperatures. At the same time, the downstream portions of the catalyst bed that receive a mixture of product and a small amount of unreacted components has much lower heats of reaction and temperature can rise relative to the inlet portion of the bed. As time progresses and catalyst deactivation occurs, the relative requirements for heat input through the bed reverse. The less active catalyst now located at the upstream portion of the bed requires less heating due to the reduced conversion of the reactants as compared to the downstream portion of the bed where a majority of the reactants are now converted.

It is an object of this invention to provide a reactor that offers greater temperature control of reactants by the indirect heating or cooling of a reaction stream by a heat exchange fluid within a reaction zone.

It is a further object of this invention to provide a process and apparatus used for indirect heat exchange of a reactant stream with a heat exchange stream for controlling the temperature profile through the reaction zone.

Another object of this invention is to provide a process that uses indirect heat exchange with a heat exchange fluid to maintain substantially isothermal conditions or a reverse temperature gradient through a reactor.

BRIEF SUMMARY OF THE INVENTION

This invention is a chemical reactor and a process for using a chemical reactor that employs an arrangement of heat exchange plates within the reactor that will maintain reactor temperatures within a desired range during the reaction. The heat exchange plates define alternate heat exchange channels and reactant channels for the heat exchange fluid and the reactants. Heat transfer is controlled in this invention by passing multiple streams of heat exchange fluid through different flow passages defined by portions of the heat exchange channels. The reactants pass through the reactant channels in a direction transverse to the direction of flow of the heat exchange fluids. The heat exchange fluid flows through a channel that varies the heat transfer coefficient as the heat exchange fluid passes through the length of the channel in indirect heat exchange with the reactant stream. The variation in the heat transfer coefficient compensates for the change in temperature of the heat transfer fluid as it heats or cools the reactants down the length of the channels. Changes in heating requirements along the length of the reactant channels are driven by the reaction kinetics as the reactants pass through the reactant channels and affects the amount of heat input needed along the length of the reactant channels. This invention at least partially subdivides the heating transfer fluid into multiple streams or passes to adjust the heat input over the length of the reactant channels. Each pass of the heat exchange fluid can begin at different temperatures to more closely maintain a desired temperature profile throughout the reactant channels. Alternately the flow rate of the heat transfer fluid may be higher in one pass relative to another to add additional heating. In this manner the degree of indirect heat exchange along the width and length of the reactor can be adjusted to maintain a desired temperature profile.

In sum this invention provides bi-directional temperature adjustment. Temperature adjustment in the direction of the reactant flow is provided by the use of the multiple heat exchange streams and the separation by appropriate partitioning. Temperature control in the direction of the heat exchange fluid, i.e. transverse to the reactant flow is preferably provided by varying the heat transfer coefficient between the reactant fluid and heat exchange fluid across the plates that define the channels.

In a simple form of the invention the heat exchange channels are partitioned to divide the heat exchange stream into multiple passes. The purpose of the partition in the heat exchange channel is to provide some separation between the different heat exchange fluids passing through different passages or portions of the channels. The term different heat exchange fluids is meant to refer to any fluid that enters a portion of the heat exchange channels defining a separate passage at a different temperature or flow rate than another heat exchange fluid. The fluids at different temperatures or flow rates may comprise the same fluid or different fluids. Differing heat exchange fluids will preferably comprise materials having different heat capacities to provide a differing amount of heat input in the different passage ways formed by the partitioned channels. The partitions defining the different passages for the heat exchange fluid may completely isolate different heat exchange fluids in different portions of the passage way or may simply provide a restriction to the flow such that most of the heat exchange fluid entering a passage way remains in that passage way until exiting the exchange channels.

In most cases the temperature of the heat exchange fluid will become more uniform as they approach the end of the heat exchange channels. Therefore the partition may extend only partially through the heat exchange channels when it is used to separate different temperature fluids. In such cases all of the heat exchange fluids may be collected through a common outlet.

The number of different heat exchange fluids or subdivided heat exchange flows passing through the heat exchange channel through separate passages will vary depending on the changes in the heat requirements for the reaction taking place and the degree of temperature precision desired for the operation of the reaction zone. To achieve the benefits of this invention, the heat exchange channels are partitioned into at least two separate passages. In other arrangements the heat exchange channels may be divided into three, four, or more separate passage ways that receive heat exchange fluids at different temperatures. Partial partitioning is particularly effective in increasing the number of passage ways into which the heat exchange channels may be divided.

Through this invention bi-directional control of temperatures through the reaction zone is achieved. Preferably this invention will maintain the desired inlet and outlet temperatures within 10° F. and more preferably within 5° F. of a desired temperature profile through the reactant channels. The temperature across the reactant channels will also preferably remain within a range of 10° F. and more preferably within 5° F. of a desired temperature profile across the reactant channels. Accordingly the heat exchange channels may maintain rising temperature profiles, falling temperature profiles or isothermal conditions regardless of the exothermicity or endothermicity of the process taking place.

Where isothermal conditions are desired the inlet and outlet temperature of the reactant fluid are approximately equal, such that one requirement of the substantially isothermal conditions described in this invention is that the mean inlet and outlet temperature vary by no more than 10° F. and preferably by no more than 5° F. Thus this invention has the added advantage of permitting adjustment of the heating variation over the width of the reactant channels to fine tune the temperature control.

A process and catalyst reactor arrangement that uses this invention may employ single or multiple reaction zones within a reactor vessel. The advantage of this invention is that the reactor vessel can provide the desired temperature gradient over the entire length and width of the reactant channels without intermediate withdrawal and recycling of reactants or heat exchange medium between the inlet and outlet of the reactor. The multiple reaction zones within the reactor vessel can be used to accommodate variations in heat adjustment by a number of different methods for varying heat transfer coefficients across the heat transfer plates.

In the case of a moving bed of catalyst, a replacement or withdrawal of catalyst maintains a relatively uniform activity profile for the catalyst through the bed. In such cases, the temperature control provided by the multiple input of heat exchange fluids passing transversely to the reactants remains relatively constant with only minor adjustments in the temperature of individual fluids to suit changes and operational conditions.

Fixed bed catalyst systems derive the most benefit from the method and arrangement of this invention. In these arrangements, multiple heat exchange streams at different temperatures indirectly contact the reactants and catalyst and provide the heat required at a given location, depending on the state of catalyst activity and deactivation throughout the bed. In a simplified case of a fixed bed arrangement, a partition divides the heat exchange channels so that the first heat exchange fluid primarily heats the first half of the bed and a second heat exchange fluid principally contacts the back half of the bed. When the catalyst is fresh, the first heat exchange fluid has a higher temperature than the second heat exchange fluid to provide more heat to the reactants in the inlet portion of the beds. As continued contacts of the catalyst with reactants progressively deactivates the catalysts, the temperature of the first heat exchange fluid decreases relative to the temperature of the second heat exchange fluid. The second heat exchange fluid then provides more heat to the back half of the bed where the more active catalyst produces a higher conversion of reactants and increases the heat input requirements to maintain a constant temperature across the reaction zone.

Accordingly, in an apparatus embodiment, this invention is a reactor for controlling temperature profiles in a reaction zone. The reactor comprises a plurality of spaced apart plates, and each plate has an extended length that defines the boundary of a heat exchange flow channel on one side of the plate and a boundary of a reaction flow channel on an opposite side of the plate with each plate defining heat exchange channels. A partition divides at least a portion of the length of the heat exchange channels into a first passage and a second passage by restricting the flow of heat exchange fluid between the first passage and the second passage. Means are provided for passing a reaction fluid through a plurality of the reactant flow channels along a first flow path in a first direction. Means are also provided for passing a first heat exchange fluid into the first heat exchange passage along a second flow path that is perpendicular to the flow direction along the first flow path and passing a second heat exchange fluid into the second heat exchange passage along a third flow path that is perpendicular to the first flow path. Means are provided for recovering the first and second heat exchange fluid from the first and second passages and for varying the heat exchange coefficient between the reactant channels and the heat exchange channels along the second and third flow paths.

In another embodiment, this invention is a process for controlling the temperature of a reactant stream in a chemical reaction by indirect heat exchange with a heat exchange fluid across a multiplicity of plate elements. The process passes a first heat exchange fluid at a first temperature from a first heat exchange inlet to a first heat exchange outlet through a first portion of a first set of elongated channels formed by a first side of the plates. The process also passes a second heat exchange fluid at a second temperature from a second heat exchange inlet to a second heat exchange outlet through a second portion of the first set of elongated channels that are formed by the first side of the plates. The process restricts fluid flow between the first and second portion of the first set of elongated channels. A reactant stream passes from a reactant inlet to a reactant outlet in a direction transverse to the first and second heat exchange fluid through a second set of channels formed by a second side of the plates. The process exchanges heat between the heat exchange fluids and the reactant stream by contacting at least one of the reactants and the heat exchange fluids with a heat exchange surface that has a varied coefficient of heat transfer over its length.

Heat exchange channels may be partitioned into any number of heat exchange channels that will provide the desired degree of temperature control. Multiple heat exchange fluids at different temperatures may be obtained by a suitable manifolding arrangement that blends a high temperature fluid with a low temperature fluid in the necessary proportions to provide the degree of desired temperature variation for a large number of heat exchange streams. In suitable cases, the lower temperature heat exchange stream may comprise the cooled portion of the high temperature heat exchange stream after it has passed through the heat exchange channels. The different passes of heat transfer fluid may be cocurrent or counter current.

The process may be useful in a wide variety of catalytic reactions. This invention is most beneficially applied to catalytic conversion process having high heats of reaction. Typical reactions of this type are hydrocarbon conversion reactions that include: the aromatization of hydrocarbons, the reforming of hydrocarbons, the dehydrogenation of hydrocarbons, and the alkylation of hydrocarbons. Specific hydrocarbon conversion processes to which this invention are suited include: catalytic dehydrogenation of paraffins, reforming of naphtha feed streams, aromatization of light hydrocarbons and the alkylation of aromatic hydrocarbons.

Additional embodiments, arrangements, and details of the invention are disclosed in the following detailed description of the invention.

BRIEF DESCRIPTION OF THE DRAWINGS

FIG. 1 is a schematic representation of a catalytic reaction section of this invention showing the partition and the circulation of fluids and catalyst.

FIG. 4 is a section of the reaction system shown in FIG. 1 taken along line 4—4 of FIG. 3.

DETAILED DESCRIPTION OF THE INVENTION

Figure 3:
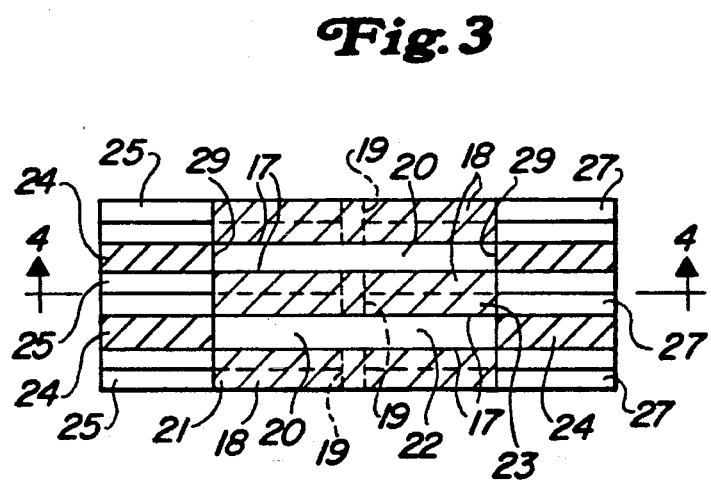
FIG. 3 is a top view of the reactor section of FIG. 1 taken along lines 3—3.

By its very design, the reactor according to this invention has the advantage of maintaining, with simple means, desired temperature profiles including isothermal or reverse gradient temperature conditions during the flow of the reactive fluid in the reactor, through the segregation of a heat transfer medium. This invention aids in the effective use of catalytic materials by controlling temperatures in a manner that enhances performance of the catalytic reaction.

The process and reactor arrangement may use homogeneous or heterogeneous catalysts. Homogeneous catalyst will typically comprise liquid catalysts that flow through reaction channels along with the reactants and are separated for recovery and recycle outside of the reaction zone. This reactor arrangement provides particular benefits with heterogeneous catalysts. Heterogeneous catalysts are typically retained within the reactant channels by corrugated plates that define the channels and permeable members that retain the catalyst but permit the flow of reactants therethrough. In most cases, the heterogeneous catalyst will comprise particulate material retained between the plates and the reactor may be arranged to permit the continuous addition and withdrawal of particulate material while the reactor is on stream. The catalyst particles typically comprise grains of a small size. The particles may take on any kind of shape, but usually comprise small spheres or cylinders.

The practice of this invention does not require any particular method for varying the heat transfer coefficient along the length of the heat exchange channels. Methods for varying this heat transfer coefficient include increasing or decreasing the number of heat exchange channels over the flow path length of the reactant channels. Another method of varying the heat exchange transfer coefficient is by the use of corrugation formed in the plates that define the channels wherein the corrugation have a varied geometry over the length of the reactant channels. Yet another method of varying the heat transfer coefficient uses a heat adjustment plate that non-uniformly increases the surface area or raises the turbulence within the reactant channels. Possible configurations of the reaction section may place two or more such heat adjustment plates within each reactant channel to offer greater control to turbulence and heat transfer within a channel.

The type and details of the reactor arrangements contemplated in the practice of this invention is best appreciated by a reference to the drawings. FIG. 1 is a schematic representation of a catalytic reactor section 10 designed to effect a catalytic reaction on a reactant fluid while using indirect heat exchange with a heat transfer fluid to maintain favorable reaction temperatures as the reactant fluid flows through the catalytic reaction section. The catalytic reaction section comprises a stack of heat exchange plates 17 of the type represented in FIGS. 2 and 3. Each plate 17 is stacked in a spaced apart relationship next to adjacent plates 17 to form two circulation systems, the first one for a flow of a reactant fluid 12 and the second one for a flow of heat exchange fluid streams 14 and 15. A flow of catalyst may also pass through the first circulation system.

Figure 2:
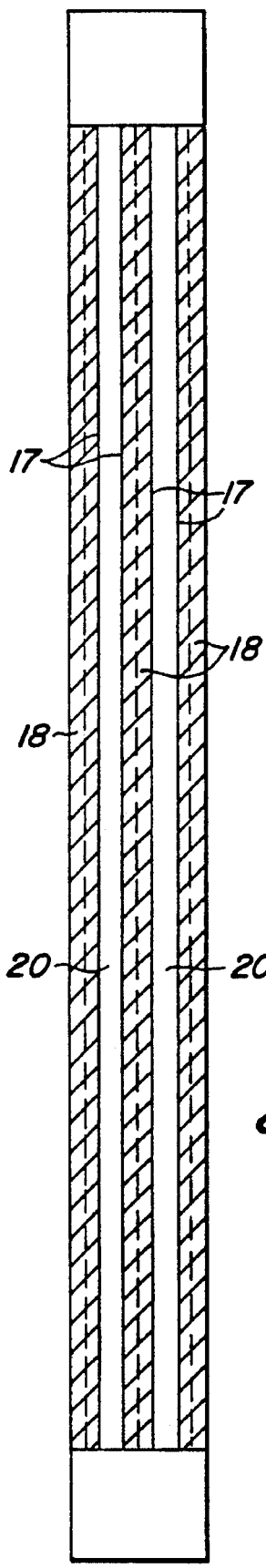
FIG. 2 is a side view of the catalytic reaction section taken along lines 2—2 of FIG. 1.

Together FIGS. 1 through 3 define a specific circulation system, wherein the reactive fluid and the heat exchange fluid respectively, flow in crosswise directions, i.e. perpendicular and through alternate channels formed between adjacent plates 17. In FIG. 1, a reactant fluid passes horizontally in the direction indicated by arrows 12. The heat exchange fluid flows transversely to the reactant fluid in the direction indicated by arrows 14 and 15. Catalyst, when present as a moving bed, passes through the reactant channels with the reactants in the direction and at a location indicated by arrows 16. FIG. 2 shows via a side view, the arrangement of alternate heat exchange channels 18 and reactant channels 20 formed by the plurality of heat exchange plates 17. Reactant-channels 20 are open at-the edge of the reactor and the heat exchange channels are isolated from the reactant channels. Where the reactant channels also contain a particulate catalyst material, a suitable screen covers the open sides of reactant channels 20 to retain the catalyst. The sides of heat exchange channels 18 are sealed to confine the heat exchange fluid for vertical flow through the reaction section.

When flowing through reactant channels 20, the reactant fluid undergoes a catalytic reaction accompanied by a liberation or an absorption of heat. The function of the heat exchange fluid circulating in the heat exchange channels is to convey the heat to be added to or removed from the reactant fluid, in order to maintain favorable reaction conditions. Such conditions can again include isothermal conditions during the circulation of the afore-mentioned reactive fluid in the catalytic reactor or a reverse temperature gradient. The heat exchange fluid is either a gas or a liquid, depending on the specific operating conditions of each process.

FIG. 1 also shows a partition 19 extended vertically through the reactor 10. The partition 19 as shown in FIG. 3 extends only through heat exchange channels 18 to form a passage 21 through the heat exchange channels at the inlet side of the reactor and a passage 23 through the side of the reactor where the reactants exit. Partition 19 may be formed by any member that will at least restrict the flow of heat exchange fluid between passage ways 21 and 23. Partition 19 preferably extends over the entire length of heat exchange channels 20 to keep heat exchange fluids from passage ways 21 and 23 separated across the full length of the heat exchange channels between the heat exchange fluid inlet and heat exchange fluid outlet. A partial partition that extends only across a portion of the length of heat exchange channel 20 can also provide a degree of temperature control that may be satisfactory in some operations. Having the partition extend over the entire length has the added advantage of permitting cocurrent or countercurrent flow of the different temperature heat exchange fluids. Whether partial or full, the partition's effectiveness requires that the partition extend all the way to the inlets of the heat exchange fluid to prevent mixing of different temperature heat exchange fluids as they initially enter the heat exchange channels.

As depicted in FIGS. 1–3 only the ends of the heat exchange channels are open such that suitable manifolding can provide the heat exchange fluid associated with streams 15 into inlets 25 as shown in FIG. 3 and heat exchange fluid indicated by arrows 14 through the inlets 27 as shown in FIG. 3. Therefore, for a simple arrangement of this invention, heat exchange fluids streams at different temperatures enter separate sides of the reactor. Suitable configurations of partitions for subdividing the heat exchange channels into further passage ways and supplying the heat exchange fluid to the passage ways at different flow rates or temperatures can be readily put into practice by those skilled in the art.

Suitable heat exchange plates for forming the reactant channels and heat exchange channels of this invention will comprise any plates allowing a high heat transfer rate and which are easily secured into a reaction section in a stable configuration. The plates may be formed into curves or other configurations, but flat plates are generally preferred for stacking purposes. Thin plates are preferred and typically have a thickness of from 1 to 2 mm. The plates are typically composed ferrous or non-ferrous alloys such as stainless steels. The partitions may also be formed from similar thin plate materials into suitable configurations to give the desired amount of flow restriction between section of the heat exchange channels.

For a typical endothermic process operation the arrangement of FIGS. 1–3 has the reactants flowing transversely in the direction of arrows 12. Where isothermal condition are desired heat exchange stream 15 has a higher temperature than heat exchange fluid 14. As the reaction proceeds with a fixed bed of catalyst the temperature of stream 14 must increase as the catalyst deactivates in the upstream portion of the reactant channels. If the system has a moving catalyst bed no such reversal of relative temperatures between streams 14 and 15 will normally occur.

The arrangement of heat exchange channels and reactant channels for moving catalyst beds is further illustrated in FIGS. 1–3. As indicated by FIG. 3, the outer ends of the heat exchange channels 18 are open to direct different temperature heat exchange fluids into the channels as described. The outer section 24 of reactant channels 20 are closed off to keep the heat exchange fluid out of the reactant channels. Partitions 29 separates the central portion of heat exchange and reactant channels from the outer ends of the channels. Inside partitions 29 the central portion of heat exchange channels 18 are closed to fluid flow. Closing the center of heat exchange channels 18 permits the center section of the reaction section to receive a particulate catalyst and distribute the catalyst to the open central portion 22 of reactant channels 20. Thus, catalyst passing vertically through the reactant channels enters the reaction section through the central portion 22 of the reactant channels. The vertically flowing reactants and catalyst exit the reaction section through a similar arrangement at the bottom of the reaction section. As shown in FIG. 4, central portion 22 of the reactant channels distributes catalyst to a series of baffles 26 that distribute the catalyst to the reactant channels. A series of baffles 28 at the bottom of reaction section 10 channel catalyst to a central portion 23 of the reactant channels for the withdrawal of catalyst from reaction section 10.

The use of two or more heat exchange fluids control the heat input to the reactant channels in the direction of the reactant flow. This invention also uses means for controlling the heat input to the reactant channels in the direction of the heat exchange fluid flow. As mentioned this heat input control can take on a variety of forms. One possible method is to restrict heat exchange fluid flow near the inlet to the reactant channels so that the heat exchange fluid has a reduced residence time or contact area when it first enters the heat exchange channels. For example in an endothermic process, after indirect heat exchange with the reactant has cooled the heat exchange fluid, the residence time or contact area increases to provide the longer heat exchange contacting with the lower temperature heat exchange fluid. Other contemplated methods for controlling heat exchange and temperatures in the direction heat exchange fluid flow influence the heat transfer coefficient across the plates forming the reactant and heat exchange channels.

One preferred method is depicted in FIG. 4 wherein plates 17 have a corrugated surface creating peaks 30 and valleys 32 that separate reactant channels 20 as well as heat exchange channels 18 into subchannels. The corrugations of plate 17 have a varied pitch that further alters heat transfer coefficients down the length of the heat exchange channels to provide additional adjustment in the degree of heating or cooling provided by the indirect heat exchange. The variation in the pitch of the corrugations further assists in maintaining a desired temperature profile through the reaction section. The plate arrangement of FIG. 4 represents a typical corrugation pattern for an exothermic or endothermic process. At the upper inlet end the pitch angle of the corrugations is small, i.e. the principle direction of the corrugations approach a parallel alignment with the heat exchange fluid flow. At the lower end of the plate where the heat exchange fluid exits, the pitch angle of the corrugations is wide to increase relative heat transfer, i.e. the principle direction of the corrugations approach a perpendicular or transverse alignment with respect to the heat exchange fluid flow. Corrugation pitch angles can be in a range of from greater than 0° to less than 90° degrees. Typically the corrugation pitch angle from an inlet to an outlet section of a plate will range from about 10° to 80°, and more typically in a range of about 15° to 60°. In a particularly preferred arrangement, the plates will make an angle of less than 30° at the inlet end of the plate and an angle of more than 35° at the outlet end of the plate. The varying corrugations may be formed in a continuous plate section or the plate section of the type shown in FIG. 4 or they may be made from several plates having corrugations at different pitch angles.

The specific heat transfer relationship for the corrugated plate exchange design is established by the fundamental equation expressing heat transfer between two fluids. This relationship is as follows:

$$P = h \times S \times LMTD$$

where:

P is the amount of heat exchanged, h is the local or overall heat transfer coefficient, S is the heat exchange area between fluids, and LMTD is the logarithmic mean temperature difference.

The logarithmic mean temperature difference is readily determined by the desired temperature difference at any point along the plate.

For a series of corrugated plates defining alternate channels of catalyst particles and heat exchanger fluid, the local or overall heat transfer coefficient can be calculated by using the following equation:

$$h = f(a, e, dp)$$

where a is the pitch angle of the corrugations, e is the distance between two plates 17, and dp is the equivalent diameter of catalyst particles.

Appropriate values of h can be established by modeling or computed using known correlations for establishing heat transfer coefficients over corrugated surfaces and, where present, through particle beds. Correlations for localized heat transfer through particle beds may be found in Leva, Ind. Eng. Chem., 42, 2498 (1950). Correlations for heat transfer along corrugations are presented in AIChE Symposium Series No. 295 Vol. 89 Heat Transfer Atlanta (1993).

The area of exchange between the reactive fluid and the auxiliary fluid can be calculated by using the equation:

$$S = \epsilon \times n \times l \times L$$

where: $\epsilon$ is a correction factor for the elongation of the plates resulting from the corrugations, n is the number of plates in contact with both heating and reactant fluids, 1 is the plate width, and L is the plate length.

By varying the number of plates and the characteristics of the corrugations, especially the pitch angle of the corrugations, the corrugations provide means for maintaining desired temperature conditions in the direction of the heat exchange fluid flow.

In addition to a variation in a corrugation pattern FIGS. 2–3 also show a heat adjustment plate 11 as a dashed line centered in the heat exchange channels. The heat adjustment plate defines protrusion that extend into the heat transfer channels that change the surface area within the channel and reduce or increase turbulence within the channel. Raising or lowering the turbulence in the heat exchange channel increases or decreases the heat transfer coefficient across the heat exchange plates that separate the reactant channels from the heat transfer channels. In this manner the degree of indirect heat exchange along the length of the reactor can be adjusted to maintain a desired temperature profile.

The heat adjustment plate 11 is susceptible to a variety of configurations. The only essential requirement is that the plate have a surface that creates a varied amount of turbulence as the heat transfer fluid contacts different portions of the plate. The plate can induce variations in turbulence by changing the surface roughness over different portions of the plate or using a varied number and size of a perforations over the plate. The more effective arrangements of this invention use the adjustment plate to define protrusions that extend from the plate and project into the flow path of the heat exchange fluid as shown in FIG. 5.

The number and amount of protrusions can be adjusted over the surface of the plate to provide the desired degree of temperature adjustment within the reactant channels. For example in an endothermic reaction more or larger protrusions are provided in the heat exchange channels that heat the portion of the reactant channels located toward the outlet of the reactor. The increased number of protrusions toward one end of the reactor selectively increases heat exchange at the outlet end of the reactant channels and provides the necessary heat input to maintain a constant temperature throughout the reactant channels. The number of protrusions provided over the plate can be adjusted as needed to suit the endothermicity or exothermicity of the reaction occurring in the reactant channels.

In a preferred form of the invention, the surface irregularities are formed by punching laterally extending tabs from the heat adjustment plate material and bending the tabs into the flow path of the heat exchange fluid. FIG. 5 shows a heat adjustment plate 11 from which tabs 34 have been bent outwardly. Adjustment of the turbulence induced by the tabs can be varied by changing the projection of the tabs into the flow path of the heat exchange fluid or increasing the number of tabs in portions of the heat exchange channels where additional heat transfer is desired.

Figure 5:
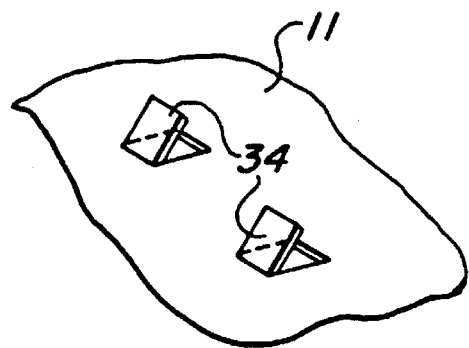
FIG. 5 is a section of a heat adjustment plate for use with this invention.
Figure 6:
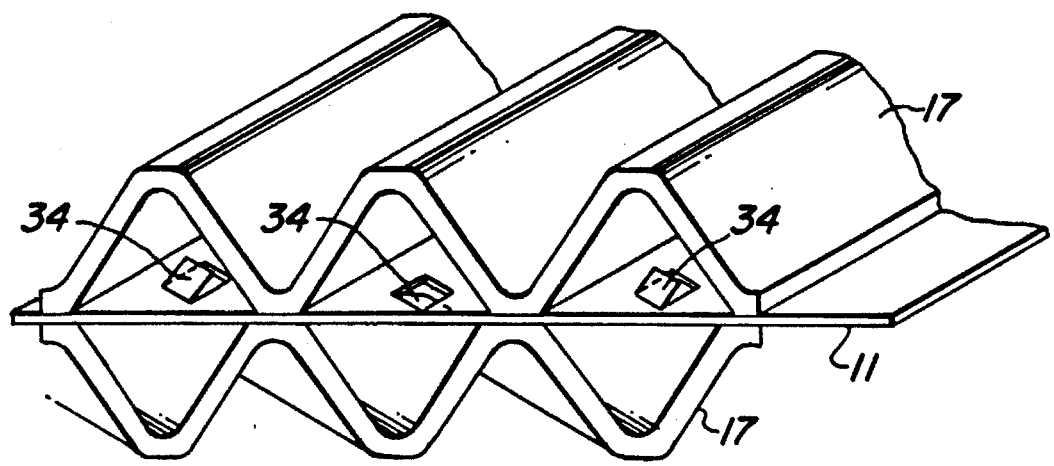
FIG. 6 is a perspective view of channels containing a heat adjustment plate of FIG. 6.

FIG. 6 depicts a typical cross-section of a corrugated heat exchange channel made of corrugated heat transfer plates and containing a heat adjustment plate of the type depicted in FIG. 5. The corrugation peaks of the heat exchange plate 17 retain heat adjustment plate 11 in a sandwich configuration. Heat adjustment plate 11 generally crosses through the center of heat adjustment channels 18. Heat adjustment tabs 34 occupy a central portion of the heat adjustment channel 18. Preferably heat adjustment tabs 34 will not contact the heat adjustment plate 17. Suitable heat adjustment plates can have an imperforate surface to prevent exchange of heat transfer fluid across the heat adjustment plate. Preferably, the heat adjustment plate will have perforations associated with the protrusions to permit passage of the heat exchange fluid across the heat adjustment plate. FIG. 6 also shows a preferred form for the tabs where alternate tabs project away from opposite sides of heat adjustment plate 11. Heat adjustment plate 11 will preferably comprise a thin plate having a thickness similar to that of the heat transfer plates.

Thus, in addition to control of heat transfer coefficients offered by the corrugation pattern of the heat exchange plates the heat adjustment plate can offer alternate or supplemental temperature control. The change in the heat transfer coefficient and the effects of the heat transfer surface position at a given location of the channels by the increased degree of turbulence and the geometry of the projections is readily calculated by methods well known to those skilled in the art. Accordingly, the variation in the heat transfer coefficient achieved by the pattern of surface irregularities on the heat transfer adjustment plate can be readily calculated or determined experimentally.

An essential element of this invention is the provision of multiple flow paths for the heat exchange fluid. Multiple flow paths can be provided in a variety of ways. The heat exchange fluid be partitioned by providing separate and distinct flow channels or otherwise continuous reactant flow channels may be subdivided by using the partition plate as depicted in FIGS. 1–4. In this arrangement the partition passes through heat exchange channels to separate the channels. Regardless of its form, the partitioning between the heat exchange channels should still provide relatively unrestricted passage of reactants over the entire flow path for the reactants through the reactant channels.

Figure 7:
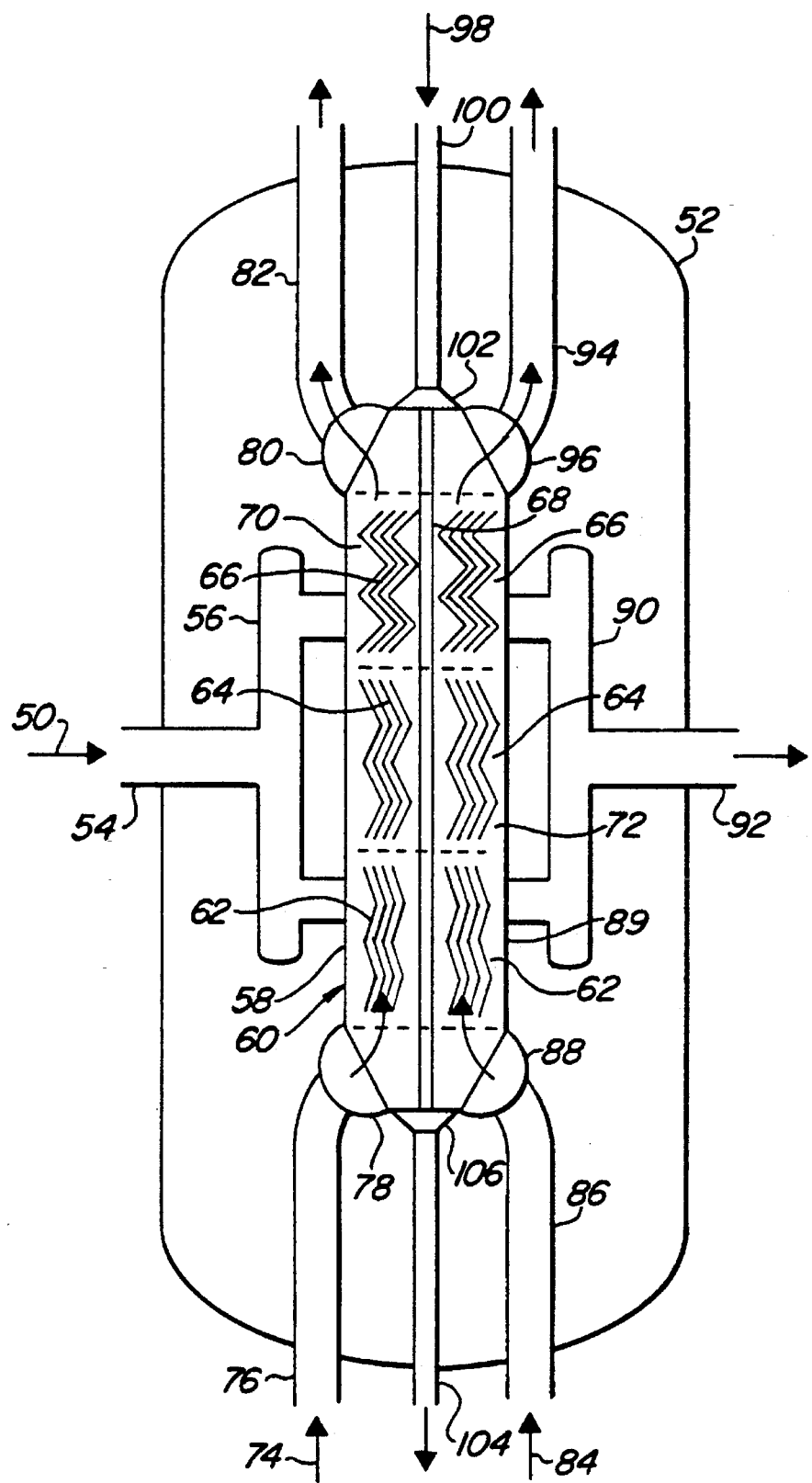
FIG. 7 is a sectional elevation showing a schematic representation of a preferred arrangement for a reactor of this invention.

FIG. 7 depicts a specific form of the invention that uses two heat exchange fluids to heat reactants in a transverse flow arrangement. A reactant stream 50 enters a reactor vessel 52 through a reactant inlet nozzle 54. The reactants are distributed by a manifold 56 over a reactant inlet face 58 of a stack 60 of the heat exchange plates. Stack 60 of heat exchange plates have an arrangement similar to that depicted in FIG. 1 through 4. It contains alternate channels for reactants and heat exchange fluid. The heat exchange plates that form the heat exchange channels comprise sections 62, 64, and 66, each section having differing corrugation angles that vary from 20° in section 62, 30° in section 64, and 40° in section 62.

A partition 68 extends vertically through the heat exchange channels and separates the heat exchange channels into a passage 70 and a passage 72 The heat exchange fluid stream 74 enters a reactor 52 via a heat exchange nozzle 76. Nozzle 76 communicates the first heat exchange fluid to a manifold 78 that directs the heat exchange fluid into the heat exchange channels of first passage way 70. As the heat exchange fluid indirectly contacts the reactants across the corrugations of first corrugation section 62, the initially high temperature heat exchange fluid rapidly exchanges heat with the reactants. As the heat exchange fluid continues to travel up the reactor into corrugation 64, it has a somewhat diminished temperature. The corrugations in corrugation section 64 have a greater corrugation angle than those in corrugation section 62. The increased corrugation angle increases the amount of heat transfer occurring across the corrugated plate such that a uniform temperature is maintained in the first passage way between corrugation sections 62 and 64. Similarly, as the first heat exchange fluid continues upward into corrugation section 66, its temperature if further reduced relative to the temperature in corrugation 64. The corrugation angle of the plates in corrugation section 66 is further increased relative to corrugation section 64 to provide a greater amount of heat transfer and again maintain a substantially uniform temperature of the reactants that flow transversely through the portion of the reactant channels corresponding to corrugation section 66. A manifold 80 recovers the first heat exchange fluid and directs it into a nozzle 82 for recovery from reactor 52.

As the reactants flow transversely through the reactant channels and across corrugation sections 62, 64, and 66, conversion of reactants decreases and the temperature decline of the reactant subsides relative to the temperature depression experienced by the reactants as they pass through the corrugation sections corresponding to the first passage way. Accordingly, as the reactants pass into the corrugation sections that lie transverse to passage way 72, they indirectly contact a reactant stream 84 having a lower temperature than the reactant stream 74. Reactant stream 84 enters reactor 52 via nozzle 86 and is distributed to the heat exchange channels of passage way 72 via a manifold 88. Heat exchange fluid 84 is heated to a temperature that will maintain a relatively uniform temperature of reactants as they flow transversely through the reactor in indirect heat exchange relationship with passage way 72 of the heat exchange channels. Again, as the second heat exchange fluid continues to travel upwardly through the reactor and heat exchange sections 62, 64, and 66, the stepwise increase in the corrugation angles in the different corrugation sections maintains the reactants at a substantially uniform temperature for recovery from an outlet face 89 of the stack 60 via a manifold 90. Manifold 90 discharges the products and unconverted reactants out of reactor 52. The second heat exchange medium passes out of the heat exchange channels of passage 72 and into an outlet nozzle 94 via a manifold 96.

A streams of fresh catalyst particles 98 pass into reactor 52 via a catalyst conduit 100. Catalyst conduit 100 delivers catalyst particles to the top of stack 60 via a distributor 102. Catalyst particles periodically pass out of the reaction stack through a catalyst outlet conduit 104. Catalyst outlet conduit 104 collects catalyst particles via a collector 106. The withdrawal and replacement of catalyst particles through stack 60 maintains a relatively uniform catalyst activity in the reactant channels such that reactor 52 operates with heat exchange fluid streams 74 and 84 each entering the stack at relatively constant temperatures. The volume of reactor 52 outside of the stacks, manifolds, conduits, and nozzles may be filled with a heat exchange fluid that maintains the inside of the reactor at a relatively uniform temperature and reduces differential expansion of the reactor internals.

This invention may be particularly useful many hydrocarbon conversion processes. Catalytic reforming is one such well established hydrocarbon conversion process employed in the petroleum refining industry for improving the octane quality of hydrocarbon feedstocks, the primary product of reforming being motor gasoline. The art of catalytic reforming is well known and does not require extensive description herein. Briefly, in catalytic reforming, a feedstock is admixed with a recycle stream comprising hydrogen and contacted with catalyst in a reaction zone. The usual feedstock for catalytic reforming is a petroleum fraction known as naphtha and having an initial boiling point of about 180° F. (80° C.) and an end boiling point of about 400° F. (205° C.). The catalytic reforming process is particularly applicable to the treatment of straight run gasoline comprised of relatively large concentrations of naphthenic and substantially straight chain paraffinic hydrocarbons, which are subject to aromatization through dehydrogenation and/or cyclization reactions. Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. Further information on reforming processes may be found in, for example, U.S. Pat. Nos. 4,119,526 (Peters et al.); 4,409,095 (Peters); and 4,440,626 (Winter et al), the contents of which are herein incorporated by reference.

A catalytic reforming reaction is normally effected in the presence of catalyst particles comprised of one or more Group VIII noble metals (e.g., platinum, iridium, rhodium, palladium) and a halogen combined with a porous carrier, such as a refractory inorganic oxide. The halogen is normally chlorine. Alumina is a commonly used carrier. The preferred alumina materials are known as the gamma, eta and the theta alumina with gamma and eta alumina giving the best results. An important property related to the performance of the catalyst is the surface area of the carrier. Preferably, the carrier will have a surface area of from 100 to about 500 $m^2/g$. The particles are usually spheroidal and have a diameter of from about 1/16th to about 1/8th inch (1.5–3.1 mm), though they may be as large as 1/4th inch (6.35 mm). A preferred catalyst particle diameter is 1/16th inch (3.1 mm). During the course of a reforming reaction, catalyst particles become deactivated as a result of mechanisms such as the deposition of coke on the particles; that is, after a period of time in use, the ability of catalyst particles to promote reforming reactions decreases to the point that the catalyst is no longer useful. The catalyst must be reconditioned, or regenerated, before it can be reused in a reforming process.

In preferred form, the reforming operation will employ a moving bed reaction zone and regeneration zone. The present invention is applicable to moving bed and fixed bed zones. In a moving bed operation, fresh catalyst particles are fed to a reaction zone by gravity. Catalyst is withdrawn from the bottom of the reaction zone and transported to a regeneration zone where a multi-step regeneration process is used to recondition the catalyst to restore its full reaction promoting ability. Catalyst flows by gravity through the various regeneration steps and then is withdrawn from the regeneration zone and furnished to the reaction zone. Movement of catalyst through the zones is often referred to as continuous though, in practice, it is semicontinuous. By semicontinuous movement is meant the repeated transfer of relatively small amounts of catalyst at closely spaced points in time. A moving bed system has the advantage of maintaining production while the catalyst is removed or replaced.

Another preferred hydrocarbon conversion process is the alkylation of aromatic hydrocarbons. In aromatic alkylation suitable aromatic feed hydrocarbons for this invention include various aromatic substrates. Such substrates can be benzene or alkylated aromatic hydrocarbons such as toluene. The acyclic feed hydrocarbon or alkylating agent that may be used in the alkylation reaction zone also encompasses a broad range of hydrocarbons. Suitable alkylating agents include monoolefins, diolefins, polyolefins, acetylenic hydrocarbons and other substituted hydrocarbons but are preferably $C_2$–$C_4$ hydrocarbons. In the most preferred form of this invention, the alkylation agent will comprise $C_2$–$C_4$ monoolefins.

A wide variety of catalysts can be used in the alkylation reaction zone. The preferred catalyst for use in this invention is a zeolite catalyst. The catalyst of this invention will usually be used in combination with a refractory inorganic oxide binder. Preferred binders are alumina or silica. Preferred alkylation catalysts are a type Y zeolite having an alumina or silica binder or a beta zeolite having an alumina or silica binder. The zeolite will be present in an amount of at least 50 wt. % of the catalyst and more preferably in an amount of at least 70 wt. % of the catalyst.

The alkylation reaction zone can operate under a broad range of operating conditions. Temperatures usually range from 100° C. to 325° C. with the range of about 150°–275° C. being preferred. Pressures can also vary within a wide range of about 1 atmosphere to 130 atmospheres. Since liquid phase conditions are generally preferred within the reaction zone, the pressure should be sufficient to maintain the reactants in such phase and will typically fall in a range of from 10 to 50 atmospheres. Reactants generally pass through the alkylation zone at a mass flow rate sufficient to yield a liquid hourly space velocity from 0.5 to 50 hrs$^{-1}$ and especially from about 1 to 10 hrs$^{-1}$.

The alkylation zone is ordinarily operated to obtain an essentially complete conversion of the alkylating agent to monoalkylate and polyalkylate. To achieve this effect, additional aromatic substrate will usually be charged to the reaction zone. Thus, the feed mixtures are introduced into the reaction zone at a constant rate and a molecular ratio of about 1:1 to 20:1 aromatic substrate to alkylating agent with a ration of about 2:1 to 10:1 being preferred. As a result, in addition to product there will usually be a substantial amount of unreacted aromatic substrate that is removed with the product stream from the alkylation reaction zone. Additional details of aromatic alkylation processes can be found in U.S. Pat. No. 5,177,285, the contents of which are hereby incorporated by reference.

Catalytic dehydrogenation is another example of an endothermic process that advantageously uses the process and apparatus of this invention. Briefly, in catalytic dehydrogenation, a feedstock is admixed with a recycle stream comprising hydrogen and contacted with catalyst in a reaction zone. Feedstocks for catalytic dehydrogenation are typically petroleum fractions comprising paraffins having from about 3 to about 18 carbon atoms. Particular feedstocks will usually contain light or heavy paraffins. For example a usual feedstock for producing a heavy dehydrogenation products will comprise paraffins having 10 or more carbon atoms. The catalytic dehydrogenation process is particularly applicable to the treatment of hydrocarbon feedstocks containing substantially paraffinic hydrocarbons which are subject to dehydrogenation reactions to thereby form olefinic hydrocarbon compounds.

A catalytic dehydrogenation reaction is normally effected in the presence of catalyst particles comprised of one or more Group VIII noble metals (e.g., platinum, iridium, rhodium, palladium) combined with a porous carrier, such as a refractory inorganic oxide. Alumina is a commonly used carrier. The preferred alumina materials are known as the gamma, eta and theta alumina with gamma and eta alumina giving the best results. Preferably, the carrier will have a surface area of from 100 to about 500 m$^2$/g. The particles are usually spheroidal and have a diameter of from about 1/16th to about 1/8th inch (1.5–3.1 mm), though they may be as large as 1/4, th inch (6.35 mm). Generally, the catalyst particles have a chloride concentration of between 0.5 and 3 weight percent. During the course of a dehydrogenation reaction, catalyst particles also become deactivated as a result of coke deposition and require regeneration, similar to that described in conjunction with the reforming process; therefore, in preferred form, the dehydrogenation process will again employ a moving bed reaction zone and regeneration zone.

Dehydrogenation conditions include a temperature of from about 400° to about 900° C., a pressure of from about 0.01 to 10 atmospheres and a liquid hourly space velocity (LHSV) of from about 0.1 to 100 hr$^{-1}$. Generally, for normal paraffins, the lower the molecular weight the higher the temperature required for comparable conversions. The pressure in the dehydrogenation zone is maintained as low as practicable, consistent with equipment limitations, to maximize the chemical equilibrium advantages. The preferred dehydrogenation conditions of the process of this invention include a temperature of from about 4000°–700° C., a pressure from about 0.1 to 5 atmospheres, and a liquid hourly space velocity of from about 0.1 to 100 hr$^{-1}$.

The effluent stream from the dehydrogenation zone generally will contain unconverted dehydrogenatable hydrocarbons, hydrogen and the products of dehydrogenation reactions. This effluent stream is typically cooled and passed to a hydrogen separation zone to separate a hydrogen-rich vapor phase from a hydrocarbon-rich liquid phase. Generally, the hydrocarbon-rich liquid phase is further separated by means of either a suitable selective adsorbent, a selective solvent, a selective reaction or reactions or by means of a suitable fractionation scheme. Unconverted dehydrogenatable hydrocarbons are recovered and may be recycled to the dehydrogenation zone. Products of the dehydrogenation reactions are recovered as final products or as intermediate products in the preparation of other compounds.

The dehydrogenatable hydrocarbons may be admixed with a diluent gas before, while, or after being passed to the dehydrogenation zone. The diluent material may be hydrogen, steam, methane, carbon dioxide, nitrogen, argon and the like or a mixture thereof. Hydrogen is the preferred diluent. Ordinarily, when a diluent gas is utilized as the diluent, it is utilized in amounts sufficient to ensure a diluent gas to hydrocarbon mole ratio of about 0.1 to about 20, with best results being obtained when the mole ratio range is about 0.5 to 10. The diluent hydrogen stream passed to the dehydrogenation zone will typically be recycled hydrogen separated from the effluent from the dehydrogenation zone in the hydrogen separation zone.

Water or a material which decomposes at dehydrogenation conditions to form water such as an alcohol, aldehyde, ether or ketone, for example, may be added to the dehydrogenation zone, either continuously or intermittently, in an amount to provide, calculated on the basis of equivalent water, about 1 to about 20,000 weight ppm of the hydrocarbon feed stream. About 1 to about 10,000 weight ppm of water addition gives best results when dehydrogenating paraffins having from 6 to 30 more carbon atoms. Additional information related to the operation of dehydrogenation catalysts, operating conditions, and process arrangements can be found in U.S. Pat. Nos. 4,677,237; 4,880,764 and 5,087,792, the contents of which are hereby incorporated by reference.

What is claimed is:

1. A reactor for controlling temperature profiles in a reaction zone, said reactor comprising:

a) a plurality of spaced apart plates with each plate having an extended length and defining a boundary of a heat exchange flow channel on one side of said plate and a boundary of a reaction flow channel on an opposite side of said plate and each plate defining heat exchange surfaces;

b) a partition dividing at least a portion of the length of said heat exchange channel into a first heat exchange passage and a second heat exchange passage and restricting fluid flow between said first passage and said second passage;

c) means for passing a reaction fluid through a plurality of said reaction flow channels defined by said plates along a first flow path;

d) means for passing a first heat exchange fluid into said first heat exchange passage along a second flow path perpendicular to said first flow path and passing a second heat exchange fluid into said second heat exchange passage along a third flow path perpendicular to said first flow path;

e) means for recovering said first and second heat exchange fluids from said first and second heat exchange passages; and, f) means for varying the heat exchange coefficient over the length of said second and third flow paths.

2. The reactor of claim 1 wherein said plates define first corrugations having a first pitch angle in a first portion of said plates and define second corrugations in a second portion of said plates wherein said first and second portions are spaced apart along the length of said first and second flow paths, said second corrugations having a second pitch angle to provide said means for varying the heat exchange coefficient over the length of said second and third flow paths.

3. The reactor of claim 2 wherein said plates are discontinuous and said first portion comprises a first plate section and said second portion comprises a second plate section.

4. The reactor of claim 2 wherein said plates are continuous and the pitch angle of said corrugations varies over the length of each plate.

5. The reactor of claim 4 wherein the pitch angle of said corrugations with respect to the heat transfer fluid flow direction makes an angle of less than 30° at an inlet end of said plate and an angle of more than 35° at an outlet end of said plate.

6. The reactor of claim 1 wherein said reactor includes means for retaining catalyst in said reaction flow channels.

7. The catalytic reactor of claim 1 wherein said plates are parallel.

8. The reactor of claim 1 wherein each of said plates in said reactor defines a reactant channel on one face and a heat exchange channel on an opposite face.

9. The reactor of claim 1 wherein said plates define said partition.

10. The reactor of claim 1 wherein said partition completely blocks fluid flow between said first and said second passage.

11. The reactor of claim 1 wherein a fast outlet recovers said first heat exchange fluid from said first passage and a second outlet recovers said second heat exchange fluid from said second passage.

12. The reactor of claim 1 wherein a heat adjustment plate is located in said heat exchange channels and said heat adjustment plate defines a plurality of protrusions that project into said heat exchange channels, said protrusions having an area of projection into said heat exchange flow channels that varies over the length of said heat adjustment plate to produce varied turbulence across said channels and provide said means for varying the heat exchange coefficient over the length of said reactant channels along said second and third flow paths.

13. A process for controlling the temperature of a reactant stream in a chemical reaction by indirect heat exchange with a heat exchange fluid across a multiplicity of plate elements, said process comprising:

a) passing a first heat exchange fluid at a first temperature from a first heat exchange inlet to a first heat exchange outlet along a first flow path through a first portion of a first set of elongated channels formed by a first side of said plates;

b) passing a second heat exchange fluid at a second temperature from a second heat exchange inlet to a second heat exchange outlet along a second flow path through a second portion of the first set of elongated channels formed by a first side of said plates and restricting fluid flow between said first and second portion of said first set of elongated channels;

c) passing a reactant stream from a reactant inlet to a reactant outlet along a third flow path in a direction transverse to said first and second heat exchange fluids through a second set of channels formed by a second side of said plates; and, d) exchanging heat between said heat exchange fluids and said reactant stream by contacting at least one of said reactant and said heat exchange fluid with a heat exchange surface that has a varied coefficient of heat transfer along the length of said first and second flow paths.

14. The process of Claim 13 wherein said reactor retains a heterogenous catalyst between said plates in said second set of channels.

15. The process of claim 13 wherein said reactant stream comprises hydrocarbons.

16. The process of claim 13 wherein the average temperature of the reactant stream at the reactant inlet is within 10° F. of the average temperature of the reactant stream at the reactant outlet.

17. The process of claim 13 wherein said catalytic reaction is endothermic and the average temperature of the reactant stream at the reactant inlet is lower than the average temperature of the reactant stream at the reactant outlet.

18. The process of claim 13 wherein said catalytic reaction is exothermic and the average temperature of the reactant stream at the reactant inlet is higher than the average temperature of the reactant stream at the reactant outlet.

19. The process of claim 13 wherein said catalytic reaction is a reforming reaction, aromatization reaction or an aromatic alkylation reaction.

20. The process of claim 13 wherein fluid flow is completely blocked between said first portion and said second portion of said first set of elongated channels.

21. The process of claim 13 wherein said plates form corrugations having a pitch angle adjacent at least one of the reactant inlet and heat exchange inlets that differs from the pitch angle of the corrugations adjacent the heat exchange outlets or reactant outlet to vary the coefficient of heat transfer over the length of said first set of elongated channels.

22. The process of claim 13 wherein said heat exchange channels contain a heat adjustment plate that defines a plurality of protrusions that project into said heat exchange channels, said protrusions having an area of projection into said heat exchange flow channels that varies over the length of said heat adjustment plate to produce varied turbulence across said channels and vary the heat exchange coefficient over the length of said first set of elongated channels.

23. The process of claim 13 wherein said reactant channels retain a fixed bed of catalyst and said first temperature is greater than said second temperature for a first period of time and said second temperature is greater than first temperature for a second period of time.

24. The process of claim 23 wherein said reactant stream undergoes an endothermic reaction and first temperature is initially greater than said second temperature.

* * * * *

UNITED STATES PATENT AND TRADEMARK OFFICE
CERTIFICATE OF CORRECTION

PATENT NO. : 5,540,899
DATED : July 30, 1996
INVENTOR(S) : WILLIAM J. KOVES

It is certified that error appears in the above-indentified patent and that said Letters Patent is hereby corrected as shown below:

Column 17, Claim 11, line 41 should read as follows: --
The reactor of Claim 1 wherein a [fast] <u>first</u> outlet recovers   --.

Signed and Sealed this

First Day of October, 1996

Attest:

BRUCE LEHMAN

Attesting Officer    Commissioner of Patents and Trademarks